US009582121B2

(12) United States Patent
Bang et al.

(10) Patent No.: US 9,582,121 B2
(45) Date of Patent: Feb. 28, 2017

(54) SIGNAL PROCESSING FOR ACOUSTIC USER INPUT

(71) Applicant: Elliptic Laboratories AS, Oslo (NO)

(72) Inventors: Hans Jørgen Bang, Oslo (NO); Tobias Gulden Dahl, Oslo (NO)

(73) Assignee: Elliptic Laboratories AS, Oslo (NO)

( * ) Notice: Subject to any disclaimer, the term of this patent is extended or adjusted under 35 U.S.C. 154(b) by 95 days.

(21) Appl. No.: 14/489,896

(22) Filed: Sep. 18, 2014

(65) Prior Publication Data

US 2015/0002478 A1 Jan. 1, 2015

Related U.S. Application Data

(63) Continuation of application No. PCT/GB2013/050559, filed on Mar. 7, 2013.

(30) Foreign Application Priority Data

Mar. 21, 2012 (GB) .................................. 1204982.1
Mar. 23, 2012 (GB) .................................. 1205182.7

(51) Int. Cl.
G06F 3/041 (2006.01)
G06F 3/01 (2006.01)
G06F 3/043 (2006.01)

(52) U.S. Cl.
CPC .............. G06F 3/043 (2013.01); G06F 3/017 (2013.01); G06F 3/0418 (2013.01); *G06F 2203/04101* (2013.01)

(58) Field of Classification Search
CPC ........ G06F 3/0418; G06F 3/043; G06F 3/017; G06F 2203/04101

(Continued)

(56) References Cited

U.S. PATENT DOCUMENTS

2007/0211022 A1 9/2007 Boillot
2008/0062151 A1* 3/2008 Kent ..................... G06F 3/0418
345/177

(Continued)

FOREIGN PATENT DOCUMENTS

WO 2006/067436 6/2006
WO 2009/115799 9/2009

(Continued)

OTHER PUBLICATIONS

International Search Report dated Jul. 2, 2013 from International Application No. PCT/GB2013/050559.

(Continued)

*Primary Examiner* — Ariel Balaoing
(74) *Attorney, Agent, or Firm* — Beyer Law Group LLP

(57) ABSTRACT

An electronic apparatus has a transmitter arranged to transmit an acoustic signal. It also has a receiver, for receiving acoustic energy comprising a reflection of the acoustic signal from an input object. It generates an electronic received signal from the received acoustic energy. The apparatus has processing means arranged to: (i) analyze at least a portion of the received signal to determine a linear combination of basis functions which represents an interference component in the received signal; (ii) use the determined linear combination to attenuate interference within the received signal, to give a post-attenuation signal; and (iii) use the post-attenuation signal to determine a user input to the electronic apparatus.

23 Claims, 2 Drawing Sheets

(58) Field of Classification Search
USPC .......................................................... 345/177
See application file for complete search history.

(56) References Cited

U.S. PATENT DOCUMENTS

| | | | |
|---|---|---|---|
| 2010/0289765 A1* | 11/2010 | Noguchi | G02F 1/13338 |
| | | | 345/173 |
| 2011/0084940 A1 | 4/2011 | Lee | |
| 2011/0096954 A1 | 4/2011 | Dahl | |
| 2011/0103448 A1 | 5/2011 | Dahl et al. | |
| 2012/0093240 A1* | 4/2012 | McFarland | H04B 3/54 |
| | | | 375/257 |

FOREIGN PATENT DOCUMENTS

| WO | 2009/122193 | 10/2009 |
|---|---|---|
| WO | 2009/147398 | 12/2009 |
| WO | 2011/036486 | 3/2011 |

OTHER PUBLICATIONS

Written Opinion dated Jul. 2, 2013 from International Application No. PCT/GB2013/050559.

* cited by examiner

SIGNAL PROCESSING FOR ACOUSTIC USER INPUT

This application is a Continuation of International Application No. PCT/GB2013/050559, filed on Mar. 7, 2013, which is herein incorporated by reference in its entirety.

This invention relates to methods and apparatus for processing an acoustic signal to determine a user input.

WO 2009/147398, the contents of which are incorporated herein in their entirety, describes a system for using ultrasound reflections to track a user's finger or other part of a hand in space. Such a system can be implemented on an electronic device, such as a personal computer or mobile telephone, in order to allow the device to receive user input, such as cursor control commands, based on the position or motion of the user's finger.

Such a system can, however, be sensitive to interference from other sources of ultrasound within audible range. Such sources can include fluorescent lighting, a distance measuring device, home-automation movement detector, or another ultrasonic tracking system. Ultrasonic tracking or gesture recognition systems are particularly prone to interference since the desired signals are often very weak reflections.

A particular problem can arise when two or more electronic devices attempt to use acoustic input systems within audible range of each other (in the same frequency range). In such situations, using prior art approaches, a device may be unable to distinguish between reflections from an input object, such as a user's hand, and sounds from the other device. This can lead to a failure to recognise a user input correctly.

In particular, the direct path sound from another device may be many times stronger than the reflection of a transmitted signal from an input object, and can therefore swamp echoes from the input object if these overlap in time of receipt. Since users typically have a low tolerance to input failures, this can be a very serious problem.

The present invention aims to overcome such shortcomings in known approaches.

From one aspect, the invention provides electronic apparatus comprising:
transmitting means arranged to transmit an acoustic signal;
receiving means arranged to receive acoustic energy comprising a reflection of the acoustic signal from an input object, and to generate an electronic received signal therefrom; and
processing means arranged to:
analyse at least a portion of the received signal to determine a linear combination of basis functions which represents an interference component in the received signal;
use the determined linear combination to attenuate interference within the received signal, to give a post-attenuation signal; and
use the post-attenuation signal to determine a user input to the electronic apparatus.

The apparatus is preferably a device, such as a mobile telephone or laptop computer.

From another aspect, the invention provides a method of determining a user input to an electronic apparatus, the method comprising:
transmitting an acoustic signal;
receiving acoustic energy comprising a reflection of the acoustic signal from an input object;
generating an electronic received signal from the received acoustic energy;
analysing at least a portion of the received signal to determine a linear combination of basis functions which represents an interference component in the received signal;
using the determined linear combination to attenuate interference within the received signal, to give a post-attenuation signal; and
using the post-attenuation signal to determine a user input to the electronic apparatus.

From further aspects, the invention provides a software product, and a carrier or signal bearing the same, comprising instructions which, when executed on processing means, cause the processing means to:
analyse at least a portion of an electronic received signal to determine a linear combination of basis functions which represents an interference component in the received signal, where the received signal has been generated from received acoustic energy, comprising a reflection of an acoustic signal from an input object;
use the determined linear combination to attenuate interference within the received signal, to give a post-attenuation signal; and
use the post-attenuation signal to determine a user input (e.g. to an electronic apparatus).

Thus it will be seen by those skilled in the art that, in accordance with the invention, interference can be reduced or removed from the received signal by representing or modelling the interference as a linear combination of basis functions, thus resulting in a cleaner signal from which the user input can be determined. This can lead to more accurate recognition of the user's intended input.

Underlying the invention, is the applicant's realisation that many commonly-encountered sources of interference can efficiently and accurately be represented as a linear combination of suitable basis functions. This is possible because, unlike random noise (e.g. white noise), commonly-experienced interference often has a relatively slow-changing structure, a substantial part of which can be specified using only a few parameters (i.e. with few degrees of freedom).

A set of basis functions may be preconfigured for the apparatus, and the apparatus may access these basis functions (e.g. from memory) prior to determining the linear combination. For instance, the apparatus may be preconfigured to cope with single-frequency interference (e.g. from an ultrasonic motion sensor). In the case, the basis functions may be a cosine function and a sine function. In another set of embodiments, the basis functions used in the analysis may be a subset from the discrete Fourier transform basis (a set of exponential functions of varying frequencies).

In another set of embodiments, the apparatus may determine which basis functions to use in the analysis by first analysing at least a portion of the received signal (a "basis-determining portion"). This basis-determining portion may be an earlier part of the received signal than that which is analysed to determine the linear combination (the "linear-combination-determining portion"). Preferably, the basis-determining portion is a portion of the received signal that contains substantially none of the transmitted signal or any other acoustic signal transmitted by the device, or any discernible reflections thereof (or reflections above a threshold level). In this way, the basis-determining portion is likely to contain substantially only interference. The basis-determining portion may be that part of the received signal which is received immediately before the device starts a transmission, or before the direct-path flight of such a transmission first reaches the receiving means.

The linear-combination-determining portion is preferably similarly free of energy arising from the apparatus's own transmissions.

The apparatus may be configured to access a plurality of different sets of basis functions (e.g. stored in memory), from which it can select one set to use when determining the linear combination.

These different sets of basis functions may relate to different types or sources of interference which the apparatus can be expected to encounter; e.g. one set for single-frequency interference and other sets for respective devices known to emit ultrasound according to particular patterns. Where a pattern of transmissions used by another device is known, an associated set of basis functions may be available to the apparatus which are differently time-shifted versions of the same code.

The apparatus may select a set of basis functions by determining the presence of a pattern of interference associated with that set, in a portion of the received signal. It may, for instance, test a number of hypotheses about what interference might be present (one or more fixed-frequency tones; a known pattern of chirps; etc.) and determine a best hypothesis according to a predetermined best-fit criterion.

Alternatively, the apparatus may be configured to generate a set of basis functions; for instance by calculating a singular value decomposition of a matrix that represents a basis-determining portion of the received signal (e.g. a matrix portion of an impulse response image, as described in WO 2009/115799).

In all of these various embodiments, the basis functions are preferably mutually orthogonal. If they are not orthogonal, the apparatus may be configured to transform them to an orthogonal set by standard mathematical operations. The basis functions are preferably functions of time.

The same basis functions are preferably used to determine several (at least two, but potentially many more) successive linear combinations representing respective successive interference components in the received signal. Such reuse of the basis functions can be advantageous in providing a very efficient approach to attenuating interference (e.g. with low processing and power consumption), because the relatively costly operation of determining a set of basis functions need only be performed relatively infrequently.

However, in some situations the nature of the interference can change over time. The apparatus may be configured to update the basis functions at intervals or continually (e.g. at the ping rate of a periodic transmission signal), in order to be able to represent an interference component in the signal accurately. Embodiments may be configured to analyse a later portion of the received signal, received signal, or a later received signal, to determine a further linear combination of basis functions which represents a further interference component in the later received portion or signal. Such embodiments may use this further linear combination to attenuate interference within the received signal. This attenuation may be applied to a signal or signal-portion received later in time than a signal or signal-portion used to generate the aforementioned first post-attenuation signal. The later post-attenuation signal or signal-portion may also be used to determine the aforementioned user input to the electronic apparatus, or may be used to determine a further user input.

Certain sources of interference may emit one or more frequencies that change abruptly (i.e. that jump from one value to another, over time). This is the case for certain ultrasonic movement detectors, for instance. FIG. 3 shows a typical plot of frequency against time for a signal transmitted by such a movement detector.

Embodiments of the present invention may be configured to change basis functions on detecting a change in the value of a frequency component in the received acoustic energy. This frequency component preferably does not arise from the acoustic signal transmitted by the transmitting means. The apparatus may only respond if the change exceeds a predetermined threshold. The frequency component is preferably a steady frequency (i.e. a constant tone).

The apparatus may be preconfigured with information (e.g. have stored in a memory) relating to a finite number of frequency components or states to which the apparatus is configured to respond by changing basis functions on detecting the presence of such a state in the received signal. The apparatus may check for the presence of one or more of these states at regular or irregular intervals. Such pre-configuration may be possible where a developer or installer know what interference source or sources are likely to be encountered, and can configure the apparatus accordingly. On the other hand, the apparatus may be configured to learn, over time, information relating to a finite number of frequency components or states to which the apparatus is configured to respond by changing basis functions on detecting the presence of such a state in the received signal.

The apparatus may be configured to detect that a change in a frequency value of an interference component has occurred, and estimate a value for the later-received frequency. The apparatus may determine which of a finite number of stored frequency values the estimated value is closest to. More generally, the apparatus may determine which of a finite number of frequency states best fits an interference component in the received signal, according to a best-fit criterion. Each of the stored frequency values or states is preferably associated with a predetermined set of basis functions. The apparatus may use the basis functions associated with the closest value (or state) when determining a linear combination of basis functions which represents the interference component in the received signal. This is more computationally efficient, and potentially more accurate, than attempting to calculate basis functions from scratch. It also does not necessarily require the linear-combination-determining portion to be clear of reflections of the acoustic signal transmitted by the apparatus.

The transmitted signal is preferably an ultrasonic signal, since such signals are undetectable to the human user, which improves the user experience. Typically this means the signal comprises one or more frequencies, or base or median frequencies, which are greater than 20 kHz, e.g. between 30 and 50 kHz or higher. In such embodiments, the basis functions are preferably periodic functions having frequency components greater than 20 kHz or 30 kHz. This is because it will not normally be necessary to estimate sonic frequency (i.e. below 20 kHz) components in the received signal, since these are unlikely to interfere with the ultrasonic reflections of interest (or since they can easily be removed using a conventional high-pass filter).

The linear combination of basis functions may represent the interference component in any appropriate manner known to the skilled person. In particular, the linear combination may be determined as a combination which matches the interference component according to a predetermined match criterion. For a given set of basis functions, it may be that linear combination which most closely matches or estimates the interference component. A match criterion may be specific to a particular set of basis functions. It may be inherent in the processing of determining the match; for example, when performing a fast Fourier transform (FFT) on the portion of the signal.

Interference in the received signal may be attenuated in a variety of ways. In one set of embodiments, the processing means is configured to subtract the linear combination from the received signal.

In some embodiments, the set of basis functions may be considerably larger than required to represent the interference. This will typically be the case when using the discrete Fourier transform basis. The processing means may therefore be configured to attenuate interference by: determining those basis functions which have zero coefficients in the linear combination; and representing at least a portion of the received signal as a linear combination of this subset of the basis functions. Effectively, the received signal is projected onto a reduced set of basis functions, which has had the basis functions associated with the interference removed from it. Alternatively, the processing means may be configured to attenuate interference by: representing at least a portion of the received signal as a linear combination of the (full set of) basis functions; and subtracting from this representation those basis functions and associated coefficients which had non-zero coefficients in the previously determined interference linear combination. This modified representation can be used to generate the post-attenuation signal. This alternative approach is typically more computationally intensive, since a large set of basis functions is involved.

The interference which is attenuated may be, or comprise, the aforesaid interference component, or it may relate to a later-received portion of the received signal.

The interference is preferably attenuated from a portion of the signal that contains reflections from the input object. Typically this attenuation portion will be different from (e.g. non-overlapping with) the linear-combination-determining portion, since the latter ideally contains no, or only minimal, reflections of interest (so as to enable a more accurate estimation of the interference).

In some embodiments, the linear-combination-determining portion is part or all of a single column in an impulse response image. I.e. it relates primarily to reflections from a single transmission by the apparatus (where the transmitted signal is periodic or transmitted at intervals). Similarly, the attenuation portion may be part or all of a single column in an impulse response image.

The transmitted signal may be continuous or discrete. It may, for example, comprise a series of discrete, acoustic pulses or chirps, i.e. rising or falling tones. Pulse compression or other impulse estimation techniques may be applied to the received energy or to the received signal. WO 2006/067436 describes certain such techniques, which may be used in embodiments of the present invention. Analysis of the received signal to determine a set of basis functions and/or to determine a linear combination of the basis functions may occur before or after pulse compression; i.e. in the raw signal domain or in an impulse-response domain. It may occur after other processing of the received signal, such as filtering to remove reflections of the transmitted signal from surfaces other than those of the input object (e.g. to remove unwanted reflections from walls, ceiling, etc.).

Reflections from different parts of the input object will be received at different times and may exhibit different characteristics; such differences may be used to distinguish the input object from other objects from which reflections of the signals are received. Techniques for motion-based input control, which may be used with embodiments of the present invention to determine the user input, are described in the applicant's earlier applications WO 2006/067436, WO 2009/122193 and WO 2009/115799, which are hereby incorporated by reference in their entirety.

The apparatus may be configured to respond in any appropriate way to a determined input: it may write data to memory or transmit data (e.g. over a data network); execute a software function; activate or update a visual interface such as a light or a display panel; emit an acoustic signal; move an actuator; etc.

The apparatus may be distributed (e.g. with the processing means being remote from the receiving means), but it is preferably implemented on a single electronic device, such as a personal computer, laptop computer, mobile telephone, car dashboard, washing machine, etc. This may be a mobile device. Embodiments of the invention can provide a touch-less user interface for an electronic device; i.e. a user interface in which one or more features of the device can be controlled through appropriate movements of an input object; typically part of a user's body such as a hand.

The transmitting means may comprise one or more signal transmitters, such as an ultrasonic transmitter. The receiving means preferably comprises one or more signal receivers, such as a microphone, which may be separate from any transmitters or may share some or all components in common therewith.

The processing means may comprise any appropriate combination of central processing units, microprocessors, graphical processing units, DSPs, FPGAs and/or ASICs. It may also comprise storage means or memory, such as RAM, ROM, flash, EEPROM, magnetic media, etc. It may be located in an single device (e.g. inside an enclosure or casing) or may be distributed, e.g. across a network.

Features of one aspect or embodiment described herein may, wherever appropriate, be applied to any other aspect or embodiment. Where reference is made to different sets of embodiments, it should be understood that these sets are not necessarily distinct but may overlap.

Certain preferred embodiments of the invention will now be described, by way of example only, with reference to the accompanying drawings, in which.

Figure 1:
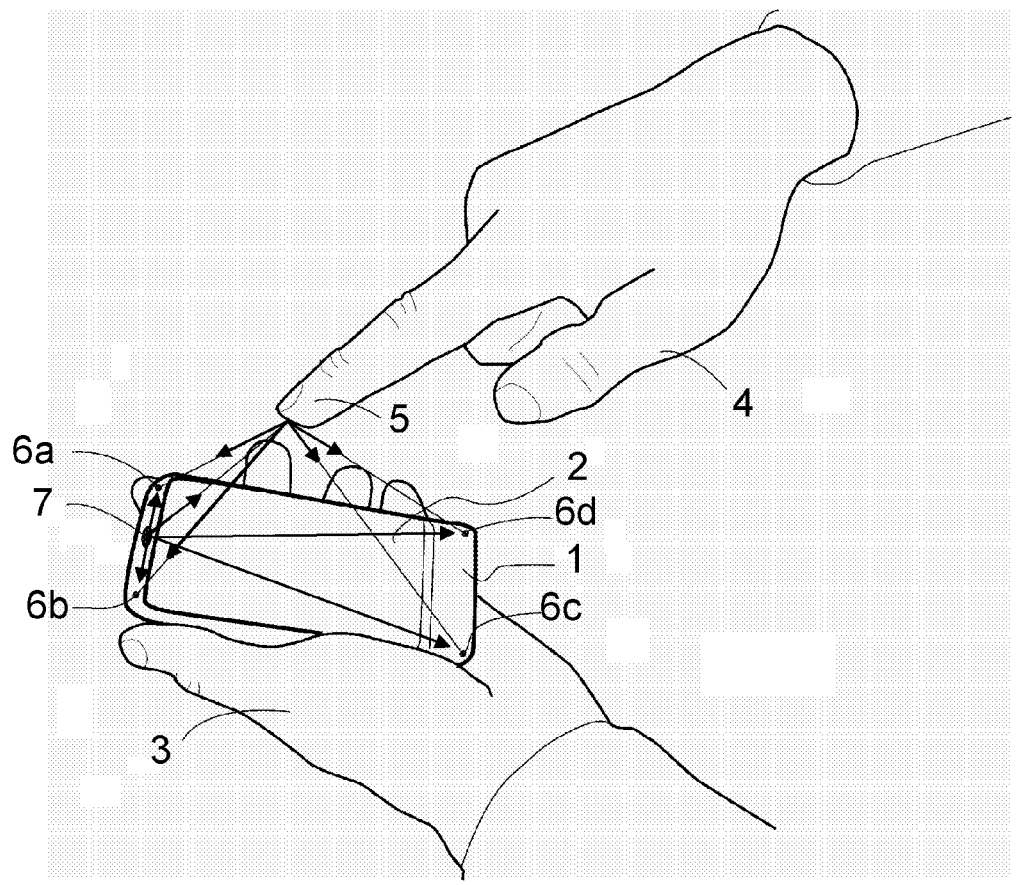
FIG. 1 is a perspective drawing of a user interacting with a handheld device.

FIG. 1 shows a handheld device 1 having a substantially rectangular LCD or OLED screen 2 on a front face of the device. Internally, the device contains processing and communications hardware and software which controls the functioning of the device, including interaction with a user. In this illustration, a user is holding the device 1 in his left hand 3, and is using his right hand 4 to provide a command to the device, by moving an extended index finger 5.

Mounted flush with, or recessed into, the front surface of the device 1 are four ultrasonic receivers 6a-6d located around the screen 2 in the respective corners of the face of the device. An ultrasonic transmitter 7 is located centrally adjacent the top edge of the display screen 2. The transmitter 7 and receivers 6a-6d are connected via associated circuitry and components to one or more digital processors inside the device 1. The transmitter 7 and receivers 6a-6d may, in addition to supporting ultrasonic signals, also be suitable for use for speech and other audio functions, thereby saving manufacturing costs and reducing the number of components visible on the surface of the device 1.

The transmitter 7 could, for example, be a Hibox HB 18E speaker, manufactured by Hibox, Taiwan, which the Applicant has found to be successfully useable for both speech and ultrasound transmissions. Similarly the receivers 6a-6d could be Sonion SiMic microphones, manufactured by Sonion, Denmark, which have sufficient bandwidth for receiving both audible and ultrasonic signals. It will be appreciated that other embodiments may have more transmitters and more or fewer receivers, and these need not necessarily all be mounted in a plane, but some could be on an edge or the reverse face of the device 1.

To characterise the motion of the user's hand 4 or fingertip 5 (which may be to determine a precise coordinate in space, or which may be to identify a particular gesture from a set of possible gestures), in one embodiment a sequence of ultrasonic chirps is transmitted from transmitter 7 at a frame rate, with intervals of silence between each pair of chirps. Other types of transmit signal may of course be used, and the device 1 may be capable of switching between two or more different types of signal or coding scheme, depending, for example, on the mode of operation, or on the level of background noise. Different chirps or other suitable signals may be coded for different receivers 6a-6d.

The transmitted chirp propagates substantially hemispherically from the transmitter 7. One part of the wavefront hits the fingertip 5 of the user's input hand 4, from which it is reflected in many directions. A part of the reflected sound is received by each of the four receivers 6a-6d. Although FIG. 1 shows only a single sound path, it will be understood that sound strikes all parts of the fingertip 5 that are in direct view of the transmitter 7, and that each receiver receives sound from many parts of the fingertip 5 at slightly different moments.

The receivers 6a-6d also receive the transmitted signals along direct paths from the transmitter 7. Because these paths will necessarily be the shorter than even the shortest reflected paths off the user's hand 4, the direct-path signals will be received first at the receivers 6a-6d.

Figure 2:
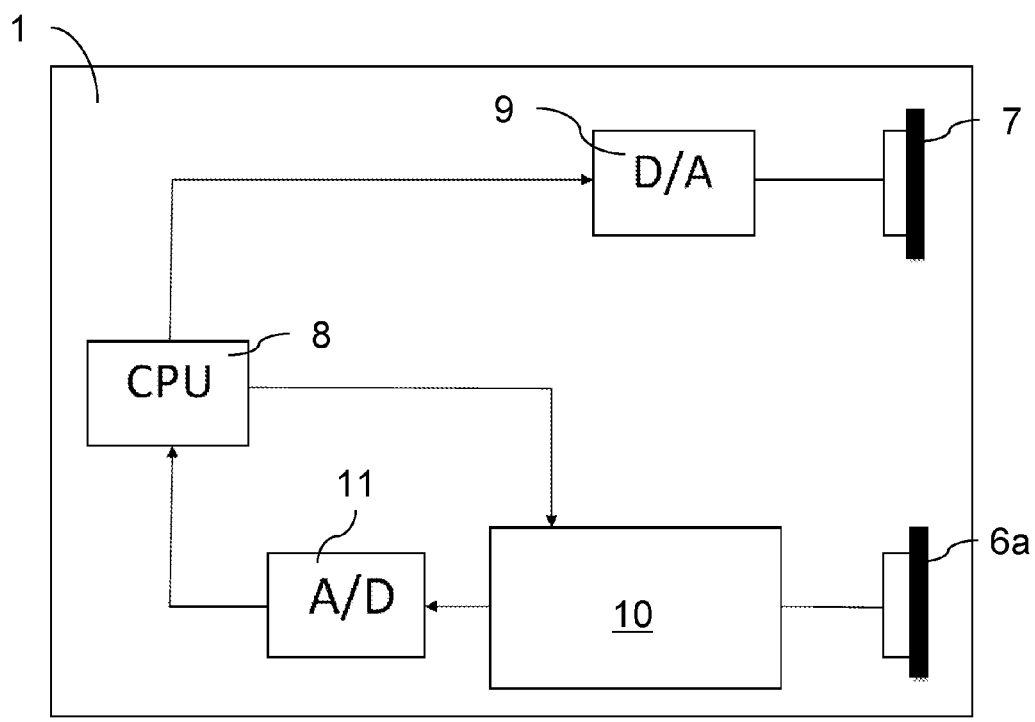
FIG. 2 is a schematic drawing of certain components of the device.
Figure 3:
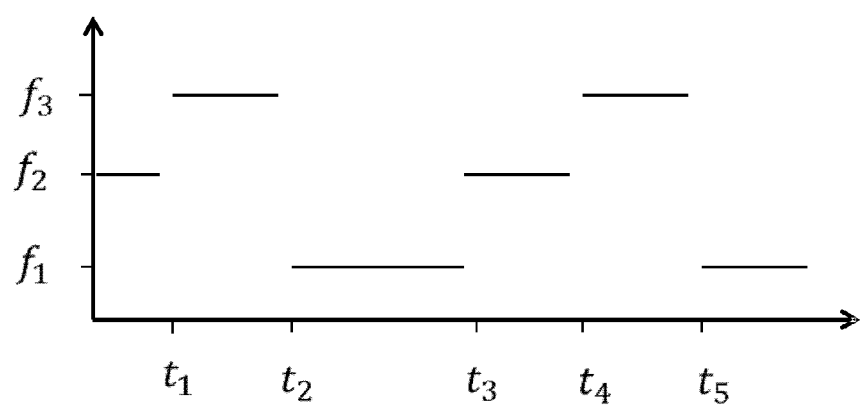
FIG. 3 is a graph of frequency against time, representative of a typical interference pattern that might be created by a known ultrasonic motion detector.

FIG. 2 figuratively shows certain components of the handheld device 1. It has a central processing unit (CPU) 8 which can output signals via a digital-to-analogue (DA) converter 9 to a loudspeaker 7.

Acoustic signals are received at a microphone 6a. These may include reflections from a signal transmitted by the loudspeaker 7 under the control of the CPU 8. They may also, however, include interference from sources of ultrasound other than the device 1 itself.

The received analogue signals can be sent to a filter unit 10, before passing to an AD converter 11, which digitises the signal and sends it to the CPU 8. The CPU 8 may also control other components of the device, such as communication modules, display screens, etc. (not shown). In some embodiments, for instance, a hardware codec module may perform functions such as sampling (in the case of an analogue microphone; if a digital microphone is used, sampling may be carried out in the microphone itself), signal conditioning, conversion to an appropriate data format, etc.

The following mathematical details explain how the CPU 8 processes received signals. It will be understood that some or all of this processing may, of course, be carried out by a DSP in some embodiments, or it may be shared between one or more CPUs and one or more DSPs in any appropriate manner, or by any other suitable processing arrangement.

Let x denote the last N samples of the received signal. These can be represented as a column vector x. (Of course, the actual data may be represented or stored in memory in any suitable manner for processing by the CPU 8).

x will typically be composed of a desired signal component d which contains reflections from an input object such as a user's hand, and an interference component z which may arise from ultrasound emissions from another device in the vicinity; i.e. x=d+z. (For simplicity, noise is ignored in this explanation of the CPU's operation.)

The CPU 8 aims to remove the interference component, or a substantial part of it, while leaving the desired signal substantially unaltered.

Although the interference component may seem random, the applicant has realised that commonly-encountered interference often has a relatively simple underlying structure, which can be efficiently determined (partially based on a priori knowledge).

The CPU 8 is thus configured to determine a small number of basis vectors $\{b_i\}$ such that z can be substantially expressed as $$\Sigma_{i=1}^{K} \alpha_i b_i$$

for some set of coefficients $\{\alpha_1\}$. Approaches for determining an appropriate set of basis vectors are described in more detail below.

An estimate of z is then calculated by estimating values of the coefficients $\{\alpha_i\}$, rather than by attempting to sample values directly. When K<<N, as is expected to be the case in most situations, this can greatly enhance the accuracy of the estimation.

In one set of embodiments, the CPU 8 estimates the coefficients $\{\alpha_i\}$ from portions of the received signal that are dominated by interference (i.e. in which a majority of the received energy relates to the interference, rather than to a signal component of interest). Let $x_p$ be one such portion and let $\{b_{pi}\}$ be an associated set of basis functions. The coefficient set $\{\alpha_i\}$ can then be estimated by the CPU 8 as $$\hat{\alpha}_i = b_{pi}^T x_p, i=1,2,\ldots,K.$$

It is here assumed that $\{b_i\}$ is an orthogonal set of functions with unit length. This need not necessarily be the case, but the skilled person will appreciate that the mathematical principles presented here remain valid, by consideration of the Gram-Schmidt orthogonalization procedure.

Alternatively, the CPU 8 may estimate the coefficients using all N samples in the received signal x. In one particular implementation $$\hat{\alpha} = b_i^T x, i=1,2,\ldots,K.$$

Including the parts of x that also contain the desired signal component when estimating z cannot give exact results, but is potentially a more robust approach as a larger total number of samples is utilized.

One the interference basis coefficients have been estimated, the CPU 8 can derive an estimate of the signal of interest as $$\hat{d} = x - \Sigma_{i=1}^{K} \hat{\alpha}_i b_i.$$

The basis functions can be determined in various ways.

One likely source of interference is other, nearby ultrasonic gesture recognition or tracking systems. Often the code (the emitted signal) used by the interfering device is known or can be obtained by adhering to a common protocol. The interfering signal can therefore often be known to be of the form $$Z = \Sigma_{i=1}^{N} a_i g_i$$

where $\{g_i\}$ are time shifts of the same code $g_i$.

Each time shift corresponds to a particular signal path (with an associated travel time) between the interfering device and the handheld device 1. There may be many such signal paths from a single interfering device, due to the reflective properties of ultrasonic waves. Nevertheless, the applicant has realised that, in practice, a substantial part of the interference energy is typically conveyed by a few dominating paths. In particular, a substantial part of the interference energy often corresponds to the direct signal between the units. When a particular signal path is strong, the corresponding delay can be accurately estimated; for example, by using a correlation receiver. The CPU 8 may therefore be capable of constructing a set of basis functions capable of expressing a substantial part of the interfering signal by applying a few known time shifts to the code g.

Another commonly-encountered pattern of interference is narrowband interference in the form of a single-frequency signal. To cope with this scenario, the CPU 8 may be configured to use a basis given by the two functions:

$$\sin 2\pi fn, \cos 2\pi fn, (n=1,2,\ldots,N).$$

Both the presence of a single-frequency interfering component and its frequency can be estimated by performing a Fast Fourier Transform (FFT) on the received signal x. To achieve a particular resolution in frequency x can be zero-padded.

Movement detectors often transmit a single-frequency ultrasonic signal. This interference can be so strong that the gesture recognition will break down unless the particular frequency component is cancelled in the received signal.

On starting up, some embodiments can identify the frequency f that best "explains" the received signal using only $\sin 2\pi fn$, $\cos 2\pi fn$ as basis functions. The handheld device 1 may be configured not to transmit a signal when estimating this best frequency. If there is a single frequency that can explain the majority of the energy in the received signal we conclude that there is strong single-frequency interference. In the rest of the session we then project the received signal down on the complement of the interference noise subspace.

The interference detection module may test whether there are several single-frequency interference components in the received signal.

In some embodiments, the basis for the interference subspace can be continually updated and not fixed on start up. Preferably, the estimation should be performed when the echoic components in the received signal are weak or ideally during silent periods (when the device itself is not transmitting), although this is not essential.

Assuming that the interference signal is composed of a number of different frequency components, the basis functions can be configured to be of the form:

$$\sin(2f_l n), \cos(2f_l n) \text{ for } n=1,2,\ldots,N; l=1,2,\ldots,L,$$

where l is the number of distinct components. The number of components and their associated frequency values can again be selected so as to best "explain" the received signal, e.g. by minimizing suitable match criteria. This framework is also appropriate when there is only one frequency component present. Depending on the match criteria, there may, however, be a risk of over-explaining the data by choosing too many frequency components. To counter this risk, priority may be given to solutions that contain fewer frequency components. This can, for example, be achieved by using the $L_2$ norm as a match criterion, and including an $L_1$ regularisation term.

Some interference sources can contain several distinct frequency components over time, but with only one being active at a given time. For example, some ultrasonic motion detectors jump between a finite number of different frequency states in an abrupt, pseudo-random fashion. However, since the number frequency states is finite, the corresponding frequencies can be stored in a memory and retrieved for later use. Consequently, the exact frequency values only have to be estimated the first time they are encountered. Once a set of occurring frequencies is established, it can suffice to test a subsequently-received signal portion against a finite number of hypotheses, in order to select a suitable pair of sine and cosine basis functions. This has the benefit that a smaller portion of the received signal can be used to identify the correct pair of basis function at a given time, than would be the case if the exact frequency values had not been pre-determined. Moreover, there is a better chance of finding the best set of basis functions, even when the portion of the received signal contains the signal of interest in addition to the interference.

In some embodiments, the device can have several active speakers using different codes. Usually there will be self-interference between the signals originating from different speakers. Again, by identifying the delays corresponding to the dominating interference paths one can reduce the total interference considerably. The strongest path is likely to be the direct path whose delay is already known on startup. When the interference is originating from the device itself exact knowledge of the interfering code is also guaranteed.

The CPU 8 may additionally, or alternatively, be configured to use a subset of the fast Fourier transform (FFT) basis as the basis functions. The subset may determined by the CPU 8 carrying out an FFT on a portion of the received signal which only contains interference. The coefficients $\{\alpha_i\}$ (which can be obtained by the CPU 8 carrying out an FFT) reveal the frequency composition of the received signal.

Although these embodiments have been described with reference to a handheld device, the invention is not limited to such devices, and could equally be applied to static appliances such as a television set, washing machine, personal computer, etc. A display screen is not necessary, although one may advantageously be provided to enhance user interaction with the device by providing visual feedback.

The invention claimed is:

1. An electronic apparatus comprising:
    a transmitting arrangement, arranged to transmit an acoustic signal;
    a receiving arrangement, arranged to receive acoustic energy comprising a reflection of the acoustic signal from an input object, and to generate an electronic received signal therefrom; and
    a processing arrangement, arranged to:
        analyse a first portion of the received signal and to identify a set of basis functions based on said analysis, wherein the first portion of the received signal contains substantially no energy arising from transmissions from the electronic apparatus;
        analyse at least a second portion of the received signal to determine a linear combination of said basis functions which represents an interference component in the received signal arising from a source other than the electronic apparatus;
        use the determined linear combination to attenuate interference within the received signal, to give a post-attenuation signal; and
        use the post-attenuation signal to determine a user input to the electronic apparatus.

2. The electronic apparatus as claimed in claim 1, wherein second portion of the received signal contains substantially no energy arising from transmissions from the electronic apparatus.

3. The electronic apparatus as claimed in claim 1, wherein the basis functions are a cosine function and a sine function.

4. The electronic apparatus as claimed in claim 1, wherein the basis functions are a subset from a discrete Fourier transform basis.

5. The electronic apparatus as claimed in claim 1, configured to access a plurality of different sets of basis functions, and to select one set of basis functions to use when determining the linear combination.

6. The electronic apparatus as claimed in claim 5, wherein the sets of basis functions include differently time-shifted versions of a pattern of transmissions used by another device.

7. The electronic apparatus as claimed in claim 5, wherein at least some of the sets of basis functions are associated with respective patterns of interference, and wherein the electronic apparatus is configured to select a set of basis functions by determining the presence, in the first portion of the received signal, of a pattern of interference associated with that set.

8. The electronic apparatus as claimed in claim 7, configured to test a number of hypotheses about what pattern of interference may be present in the signal, and to determine a best hypothesis according to a predetermined best-fit criterion.

9. The electronic apparatus as claimed in claim 1, wherein the apparatus is configured to generate the set of basis functions.

10. The electronic apparatus as claimed in claim 9, configured to calculate a singular value decomposition of a matrix that represents the first portion of the received signal.

11. The electronic apparatus as claimed in claim 1, wherein the basis functions are mutually orthogonal.

12. The electronic apparatus as claimed in claim 1, configured to use the same basis functions to determine a plurality of successive linear combinations representing respective successive interference components in the received signal.

13. The electronic apparatus as claimed in claim 1, configured to determine or select an updated set of basis functions continually or at intervals.

14. The electronic apparatus as claimed in claim 1, configured to determine a new set of basis functions on detecting a change in the value of a frequency component in the received acoustic energy, and to use the new set of basis functions in determining a linear combination of the new set of basis functions which represents a further interference component in a later-received signal-portion or signal.

15. The electronic apparatus as claimed in claim 1, comprising a memory storing information relating to a finite number of frequency states, and configured to detect the presence of one of the stored frequency states in the received signal, and to respond by changing the set of basis functions.

16. The electronic apparatus as claimed in claim 1, wherein the signal is an ultrasonic signal.

17. The electronic apparatus as claimed in claim 1, configured to determine the linear combination as a combination which matches the interference component according to a predetermined match criterion.

18. The electronic apparatus as claimed in claim 1, configured to attenuate interference within the received signal by subtracting the linear combination from the received signal.

19. The electronic apparatus as claimed in claim 1, configured to attenuate interference within the received signal by:
determining a subset of the basis functions, being those basis functions that have zero coefficients in said linear combination; and
representing at least a portion of the received signal as a linear combination of this subset of the basis functions.

20. The electronic apparatus as claimed in claim 1, configured to attenuate interference from a portion of the received signal that contains reflections from the input object.

21. The electronic apparatus as claimed in claim 1, wherein the first portion of the received signal is different from the second portion of the received signal.

22. A method of determining a user input to an electronic apparatus, the method comprising:
transmitting an acoustic signal;
receiving acoustic energy comprising a reflection of the acoustic signal from an input object;
generating an electronic received signal from the received acoustic energy;
analysing a first portion of the received signal and identifying a set of basis functions based on said analysis, wherein the first portion of the received signal contains substantially no energy arising from transmissions from the electronic apparatus;
analysing at least a second portion of the received signal to determine a linear combination of said basis functions which represents an interference component in the received signal arising from a source other than the electric apparatus;
using the determined linear combination to attenuate interference within the received signal, to give a post-attenuation signal; and
using the post-attenuation signal to determine a user input to the electronic apparatus.

23. A non-transitory computer-readable medium having stored thereon instructions which, when executed on an electronic apparatus, cause the electronic apparatus to:
transmit an acoustic signal;
generate an electronic received signal from acoustic energy received by the electronic apparatus, the acoustic energy comprising a reflection of the acoustic signal from an input object;
analyse a first portion of the received signal and to identify a set of basis functions based on said analysis, wherein the first portion of the received signal contains substantially no energy arising from transmission from the electronic apparatus;
analyse at least a second portion of an electronic received signal to determine a linear combination of said basis functions which represents an interference component in the received signal, arising from a source other than the electronic apparatus;
use the determined linear combination to attenuate interference within the received signal, to give a post-attenuation signal; and
use the post-attenuation signal to determine a user input.

* * * * *